United States Patent
Chen

(10) Patent No.: US 9,407,191 B2
(45) Date of Patent: Aug. 2, 2016

(54) DRIVING SWITCHING SYSTEM APPLIED TO MOTORS AND METHOD THEREOF

(71) Applicant: FEELING TECHNOLOGY CORP., Hsinchu (TW)

(72) Inventor: Hsuan-Chuan Chen, Hsinchu (TW)

(73) Assignee: Feeling Technology Corp., Chupei, Hsinchu (TW)

(*) Notice: Subject to any disclaimer, the term of this patent is extended or adjusted under 35 U.S.C. 154(b) by 0 days.

(21) Appl. No.: 14/844,345

(22) Filed: Sep. 3, 2015

(65) Prior Publication Data
US 2015/0381100 A1    Dec. 31, 2015

Related U.S. Application Data

(63) Continuation-in-part of application No. 14/023,738, filed on Sep. 11, 2013, now abandoned.

(30) Foreign Application Priority Data

Jun. 28, 2013   (TW) .............................. 102123170 A

(51) Int. Cl.
H02P 6/00      (2016.01)
H02P 27/08     (2006.01)
H02P 7/29      (2016.01)

(52) U.S. Cl.
CPC H02P 27/08 (2013.01); H02P 7/04 (2016.02); H02P 7/29 (2013.01)

(58) Field of Classification Search
CPC ...................... H02P 7/0044; H02P 2007/0055
USPC ......................................... 318/400.26, 400.29
See application file for complete search history.

(56) References Cited

U.S. PATENT DOCUMENTS

| 7,411,367 | B2* | 8/2008 | Tsai | .......................... H02P 6/26 318/432 |
| 7,639,064 | B2* | 12/2009 | Hsiao | ............... H03K 17/08142 327/108 |
| 2011/0062910 | A1* | 3/2011 | Tsai | .......................... H02P 6/18 318/400.35 |
| 2012/0007637 | A1* | 1/2012 | Fukuda | ............... H02M 3/1588 327/110 |

* cited by examiner

*Primary Examiner* — Eduardo Colon Santana
*Assistant Examiner* — Bickey Dhakal
(74) *Attorney, Agent, or Firm* — Rosenberg, Klein & Lee

(57) ABSTRACT

In a driving switching system, an H-bridge circuit includes a first P-type MOSFET, a first N-type MOSFET, a second P-type MOSFET and a second N-type MOSFET. The first N-type MOSFET connects to the first P-type MOSFET so as to have a first connection terminal. The second N-type MOSFET connects to the second P-type MOSFET so as to have a second connection terminal, wherein the first connection terminal and the second connection terminal are connected to a coil. A first and a second kickback voltage detection module respectively detect a first kickback voltage at the first connection terminal and a second kickback voltage at the second connection terminal. In the accompanying method, a first and a second driving module are selectively used to switch the first and second P-type MOSFET and the first and second N-type MOSFET once the first and second kickback voltages reach a first or a second threshold voltage.

10 Claims, 13 Drawing Sheets

DRIVING SWITCHING SYSTEM APPLIED TO MOTORS AND METHOD THEREOF

This Application is being filed as a Continuation-in-Part application Ser. No. 14/023,738, filed 11 Sep. 2013, currently pending. Additionally, this application claims the benefit of Taiwan Patent Application Serial No. 102123170, filed Jun. 28, 2013, the subject matter of which is incorporated herein by reference.

BACKGROUND OF INVENTION

1. Field of the Invention

The invention relates to a driving switching system applied to motors and a method thereof, and more particularly to the driving switching system and method for motors that can base on the first kickback voltage and the second kickback voltage to determine the switching among various MOSFETs to drive the motor from a first current phase to a second current phase, as preset threshold voltages are reached.

2. Description of the Prior Art

The motor is one of the popular mechanic parts in normal life. In the driving circuit of the conventional motor, the H-bridge circuit and the driving module are two important elements. Generally, the H-bridge circuit includes two P-type Metal-Oxide-Semiconductor Field-Effect Transistors (PMOSFETs) and two N-type Metal-Oxide-Semiconductor Field-Effect Transistors (NMOSFETs). In structuring, a pair of one PMOSFET and one NMOSFET in series is electrically coupled with another pair of PMOSFET and NMOSFET in series through a coil, in which the two PMOSFETs are electrically connected to the source power VDD, while the two NMOSFET are electrically connected to the ground VSS. The driving module is electrically connected the aforesaid two PMOSFETs and the aforesaid two NMOSFETs.

In the art, the H-bridge circuit is to drive the motor. As the H-bridge circuit drives the motor, it may meet a situation that the current is terminated during the commutation of the motor; such that kickback voltages would be generated at either end or both ends of the coil (where the PMOSFET and the NMOSFET are electrically connected). Sometimes, the kickback voltage may be higher than the source power VDD or lower than the ground VSS. As an ill consequence, the aforesaid PMOSFETs and NMOSFETs may be damaged, and further the motor may be degraded or even shutdown.

Further, for the nature of the PMOSFET and the NMOSFET, the parasitic diodes may extend the tolerance of the kickback voltage (for example, from VDD+Vd to VSS−Vd). However, in practice, the formation of the kickback voltage usually interferes the driving of the motor or leads to the damage of the IC through the CMOS latch-up phenomenon.

It is clear that the kickback voltage would damage the PMOSFET and the NMOSFET in the motor's driving circuit, and would dysfunction the motor to some degree. Further, the induced latch-up effect would also damage the IC. Hence, it is definitely welcome to the art to an effort in improving the motor's driving circuit to act against the kickback voltage.

SUMMARY OF THE INVENTION

In view that the kickback voltage in the conventional motor's driving circuit usually damages the PMOSFET and the NMOSFET, causes driving bias and breaks down the IC boards, thus, accordingly, it is the primary object of the present invention to provide a driving switching system applied to motors and an accompanying method thereof, in which the damage caused by the kickback voltage can be reduced by relevant and in-time switching the in-current MOSFETs based on the kickback voltage across the coil.

In the present invention, the driving switching system for driving a motor to be transformed from a first current phase to a second current phase through a relevant phase switching (commutation) includes an H-bridge circuit, a first kickback voltage detection module, a second kickback voltage detection module, a first driving module and a second driving module. The H-bridge circuit includes a first PMOSFET (P-type Metal-Oxide-Semiconductor Field-Effect Transistor), a first NMOSFET (N-type Metal-Oxide-Semiconductor Field-Effect Transistor), a second PMOSFET and a second NMOSFET. The first NMOSFET connects electrically with the first PMOSFET so as to have a first connection terminal, and the second NMOSFET connects electrically with the second PMOSFET so as to have a second connection terminal, in which the first connection terminal and the second connection terminal are both electrically connected to at least one coil.

The first kickback voltage detection module preset with a first threshold voltage connects electrically with the first connection terminal so as thereby to base on the first kickback voltage to issue a first detection signal. The second kickback voltage detection module preset with a second threshold voltage connects electrically with the second connection terminal so as thereby to base on the second kickback voltage to issue a second detection signal. The first driving module coupled electrically with the first kickback voltage detection module is to receive the first detection signal. During a first switch stage, a second switch stage and a third switch stage, the motor is driven by selectively switching between the first PMOSFET and the first NMOSFET. The second driving module coupled electrically with the second kickback voltage detection module is to receive the second detection signal. During the first switch stage, the second switch stage and the third switch stage, the motor is driven by selectively switching between the second PMOSFET and the second NMOSFET.

While in the first switch stage, the first driving module turns on/off the first PMOSFET by controlling a first PWM (Pulse Width Modulation) signal so as to increase gradually a first duty-cycle ratio of the first PWM signal. As the first kickback voltage reaches the first threshold voltage, the first kickback voltage detection module issues the first detection signal to the first driving module, and then the first NMOSFET is turned on so as to have a first residual current to flow orderly through the first NMOSFET, the coil and the second NMOSFET. While in the second switch stage, the second driving module turns off the second NMOSFET by controlling a second PWM (Pulse Width Modulation) signal so as to decrease gradually a second duty-cycle ratio of the second PWM signal and to have a second residual current to flow orderly through the first NMOSFET, the coil and the second NMOSFET. As the first kickback voltage gets higher than the first threshold voltage so as to have the first driving module to determine a phase switching from the second phase switching stage to the third phase switching stage, the second driving module is thus triggered to issue a third PWM signal to turn on/off the second PMOSFET, and also a third duty-cycle ratio of a third PWM signal is gradually decreased. As the second kickback voltage reaches the first threshold voltage, the second kickback voltage detection module issues the second detection signal to the second driving module, and then the second NMOSFET is turned on so as to have a third residual current to flow orderly through the second NMOSFET, the coil and the first NMOSFET.

In one embodiment of the present invention, as the first kickback voltage reaches a third threshold voltage, the first kickback voltage detection module enables the first driving module to turn on the first PMOSFET. Further, the first threshold voltage is less than 0, and the third threshold voltage is lower than the first threshold voltage. In addition, while in the third switch stage and as the second kickback voltage reaches the third threshold voltage, the second kickback voltage detection module enables the second driving module to turn on the second PMOSFET.

In the present invention, the method of the aforesaid driving switching system for driving motors includes the steps of: entering the first switch stage to have the first PWM signal to turn on/off the first PMOSFET, wherein the first duty-cycle ratio of the first PWM signal is gradually increased; determining if or not the first kickback voltage reaches the first threshold voltage; while a result of the step (b) is positive, turning on the first NMOSFET to flow the first residual current orderly through the first NMOSFET, the at least one coil and the second NMOSFET; entering the second switch stage to have the second PWM signal to turn on/off the second NMOSFET so as to flow the second residual current orderly through the first NMOSFET, the at least one coil and the second NMOSFET, wherein the second duty-cycle ratio of the second PWM signal is gradually decreased; determining if or not the first kickback voltage gets higher than the first threshold voltage; while a result of the step (e) is positive, entering the third switch stage to have the third PWM signal to turn on/off the second PMOSFET, wherein the third duty-cycle ratio of the third PWM signal is gradually decreased; determining if or not the second kickback voltage reaches the first threshold voltage; and, turning on the second NMOSFET to flow the third residual current orderly through the second NMOSFET, the at least one coil and the first NMOSFET.

In one embodiment of the present invention, the first kickback voltage detection module further includes a third threshold voltage, and, in the first switch stage, the first kickback voltage is further judged if or not it is reaches the third threshold voltage. As the judgment is positive, then the first PMOSFET is turned on. In addition, in the third switch stage, the second kickback voltage is further checked if it reaches the third threshold. If the check is positive, then the second PMOSFET is turned on. Also, the first threshold voltage is lower than zero, i.e., negative, and the third threshold voltage is lower than the first threshold voltage.

In one embodiment of the present invention, the first PMOSFET and the second PMOSFET are both electrically connected with a power source, the second threshold voltage is higher than a voltage provided by the power source.

By providing the driving switching system applied to motors and the accompanying method thereof in accordance with the present invention, the first NMOSFET is selectively turned on as the first kickback voltage reaches the first threshold voltage in the first switch stage, the second NMOSFET is selectively turned off gradually in the second switch stage, and the second NMOSFET is selectively turned on as the second kickback voltage reaches the first threshold voltage in the third switch stage. Thus the present invention bases on the judgment whether the kickback voltage reaches the preset first threshold voltage or not to perform the switching of turning on different MOSFETs, such that the kickback voltage can be reduced, the MOSFETs can be effectively protected, and the efficiency of the motor can be enhanced. In addition, since all possible parasitic diodes among the MOSFETs can be prevented from being turned on, thus damages upon the whole IC set can be effectively avoided.

Further, in the present invention, if the third threshold voltage is reached by the kickback voltage, an additional MOSFET is chosen to flow the current so as to rapidly reduce the kickback voltage and thus to further ensure the safety of motor driving and the driving efficiency.

All these objects are achieved by the driving switching system applied to motors and the accompanying method thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a driving switching system applied to motors and an accompanying method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The driving switching system applied to motors and the accompanying method thereof in accordance with the present invention may be variously embodied, and thus details thereabout can be elucidated for each of all possible combinations. Alternatively, only preferred embodiments are provided and details for others thereof are omitted herein.

Figure 1:
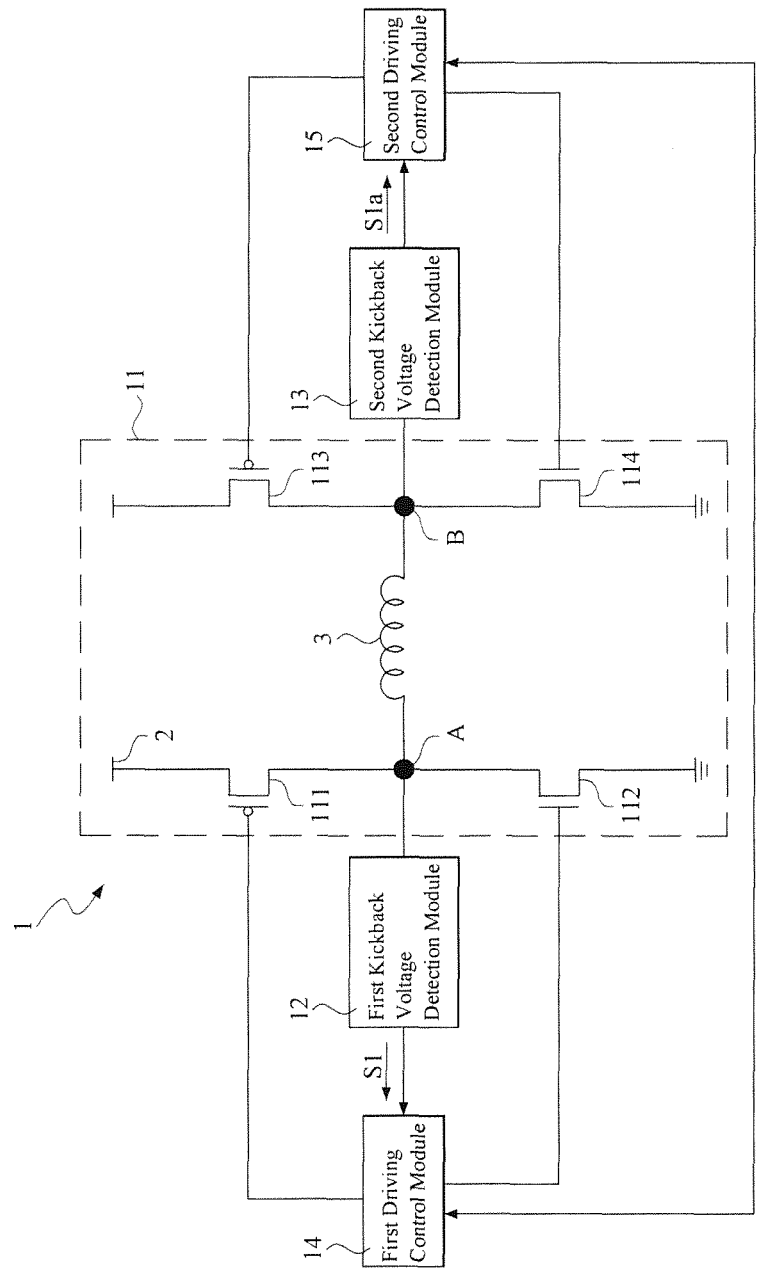
FIG. 1 is a schematic view of the preferred driving switching system applied to motors in accordance with the present invention.

Referring now to FIG. 1, a preferred embodiment of the driving switching system for motors in accordance with the present invention is schematically shown. As shown, the system 1 for driving the motor (not shown in the figure) from a first current phase to a second current phase via a phase switch stage includes an H-bridge circuit 11, a first kickback voltage detection module 12, a second kickback voltage detection module 13, a first driving module 14 and a second driving module 15

The H-bridge circuit 11 includes a first PMOSFET 111, a first NMOSFET 112, a second PMOSFET 113 and a second NMOSFET 114.

The first PMOSFET 111 has a first source end (not labeled in the figure), a first drain end (not labeled in the figure) and a first gate end (not labeled in the figure). The first source end of the first PMOSFET 111 is electrically connected to a power source 2 with a VDD voltage.

The first NMOSFET 112 has a second source end (not labeled in the figure), a second drain end (not labeled in the figure) and a second gate end (not labeled in the figure). The second source end is grounded to have a ground voltage VSS, and the second drain end is electrically connected to the first drain end so as to form a first connection terminal A.

The second PMOSFET 113 has a third source end (not labeled in the figure), a third drain end (not labeled in the figure) and a third gate end (not labeled in the figure). The third source end of the second PMOSFET 113 is electrically connected to the power source 2.

The second NMOSFET 114 has a fourth source end (not labeled in the figure), a fourth drain end (not labeled in the figure) and a fourth gate end (not labeled in the figure). The fourth source end is grounded, and the fourth drain end is electrically connected to the third drain end so as to form a second connection terminal B. The first connection terminal A and the second connection terminal B are electrically connected with a coil 3.

In the present invention, the first and second kickback voltage detection modules 12, 13 are both preset with a first threshold voltage, a second threshold voltage and a third threshold voltage. The first threshold voltage is lower than zero. (In the present invention, for the second source end and the fourth source end are both grounded to VSS, so the preset value for the first threshold voltage is lower than zero, which is the potential of VSS) The third threshold voltage is lower than the first threshold voltage, while the second threshold voltage is larger than the VDD of the power source 2. In addition, the first kickback voltage detection module 12 is electrically connected to the first connection terminal A, while the second kickback voltage detection module 13 is electrically connected to the second connection terminal B.

The first driving module 14 is electrically connected to the first kickback voltage detection module 12, while the second driving module 15 is electrically connected to the second kickback voltage detection module 13. Specifically, the first driving module 14 and the second driving module 15 can be integrated as, but not limited to, a single driving module.

The first kickback voltage detection module 12 is to detect a first kickback voltage at the first connection terminal A so as to evaluate whether or not the first kickback voltage reaches the first threshold voltage, the second threshold voltage or the third threshold voltage. As a positive detection is met, a corresponding detection signal S1 is issued. On the other hand, the second kickback voltage detection module 13 is to detect a second kickback voltage at the second connection terminal B so as to evaluate whether or not the second kickback voltage reaches the first threshold voltage, the second threshold voltage or the third threshold voltage. As a positive detection is met, a corresponding detection signal S1$a$ is issued.

The first driving module 14 is to receive the first detection signal S1. During a first switch stage, a second switch stage and a third switch stage, the motor is driven by selectively phase switching around the first PMOSFET 111 and the first NMOSFET 112.

The second driving module 15 is to receive the second detection signal S1$a$. During a first switch stage, a second switch stage and a third switch stage, the motor is driven by selectively phase switching around the second PMOSFET 113 and the second NMOSFET 114.

In the present invention, the motor includes a Hall sensor chip able to detect phase changes of the motor, for example the phase change from the first current phase to the second current phase. Herein, process for the phase changes of the motor is included as a phase switching. In practice, in the preferred embodiment of the present invention, the phase switching upon the motor is further separated into the first switch stage, the second switch stage and the third switch stage. In view of the direction change of the coil current, only two switch stages are included. The first and second driving modules 14, 15 in any of the first switch stage, the second switch stage and the third switch stage are to receive the first and second detection signals S1 and S1$a$ and evaluate if any of the first kickback threshold voltage, the second kickback threshold voltage and the third kickback threshold voltage is reached. Upon the evaluation results, the first and second driving modules 14, 15 proceed to perform on/off switching of the current around the first PMOSFET 111, the first NMOSFET 112, the second PMOSFET 113 and the second NMOSFET 114

Besides FIG. 1, please also refer to FIG. 2 through FIG. 2B, FIG. 3 through FIG. 3A and FIG. 4 through FIG. 4B, in which the phase switching of FIG. 1 in the first, second and third switch stages are illustrated schematically, respectively.

Figure 2:
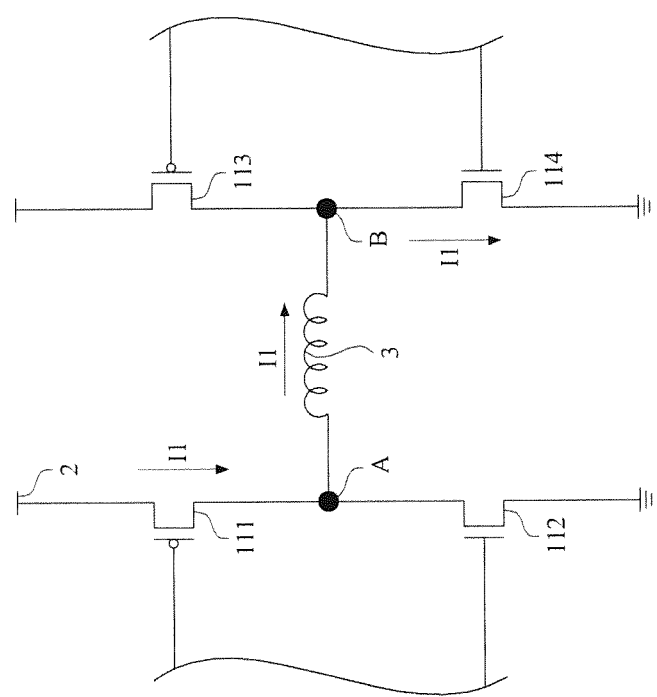
FIG. 2 through FIG. 2B illustrate schematically the switching of FIG. 1 in the first switching stage.

As shown, prior to the first switch stage, the first and second driving modules 14, 15 engage electrically respectively the first PMOSFET 111 and the second NMOSFET 114, such that the first current flow I1 can flow from the first PMOSFET 111, the coil 3 and the second NMOSFET 114. Thereby, the first and second driving modules 14, 15 can introduce a first current phase to drive the motor. As shown in FIG. 2, at this time, a pulse width modulation (PWM) signal is "on" and applied to the first PMOSFET 111, the voltage at the first connection terminal A is VDD−ΔVa, and the voltage at the second connection terminal B is VSS+ΔVb, in which the aforesaid and the below ΔVa and ΔVb are different values and depend upon the current flowing through the corresponding MOSFETs.

While in entering the first switch stage in this phase switching process, the first driving module 14 applies a first PWM (Pulse Width Modulation) signal to turn on/off the first PMOSFET 111, and a first duty-cycle ratio (H-duty) of the first PWM signal is gradually increased. Practically, the preferred embodiment of the present invention is not to turn off the first PMOSFET 111 suddenly and directly, but to turn off the first PMOSFET 111 in a rather progressive increasing manner. Namely, the first duty-cycle ratio (H-duty) may be increased gradually from 0% to 100%. As the first kickback voltage at the first connection terminal A reaches the first threshold voltage, the first kickback voltage detection module 12 would issue a first detection signal S1 to have the first driving module 14 to turn on the first NMOSFET 112, so that a first residual current Ia of the coil 3 would flow through the first NMOSFET 112, the coil 3 and the second NMOSFET 114. At this time, as shown in FIG. 2A, the voltage at the first connection terminal A is VSS−ΔVa, and the voltage at the second connection terminal B is VSS+ΔVb.

Furthermore, while in the first switch stage and as the first kickback voltage reaches the third threshold voltage, the first kickback voltage detection module 12 would issue again a detection signal S1 to the first driving module 14 and the first PMOSFET 111 is turned on so as to have the first residual current Ia (originally flowing through the first NMOSFET 112, the coil 3 and the second NMOSFET 114) to further flow through the first PMOSFET 111, the coil 3 and the second NMOSFET 114. As shown in FIG. 2B, the first residual current Ia is consisted of the current Iap from the first PMOSFET 111 and the current Ian from the first NMOSFET 112. In addition, the PWM signal is "off", the voltage at the first connection terminal A is VSS−ΔVa, and the voltage at the second connection terminal B is VSS+ΔVb.

Figure 2A:
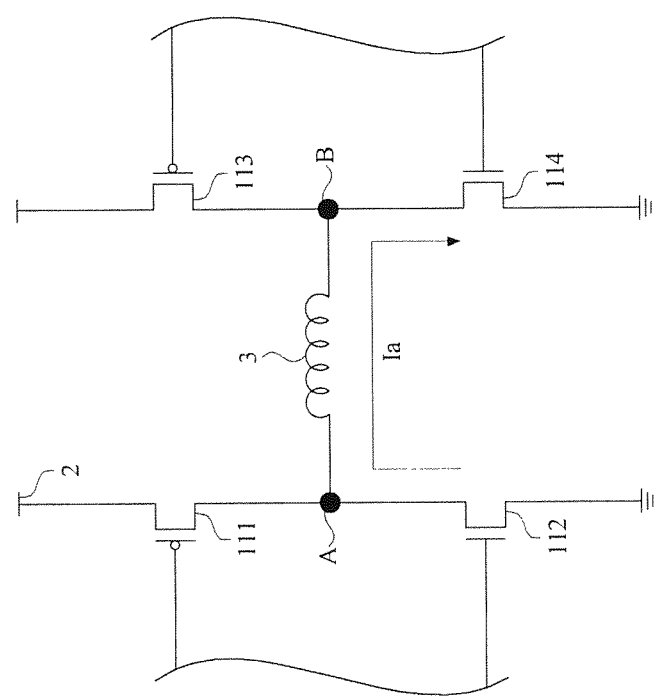
Figure 2B:
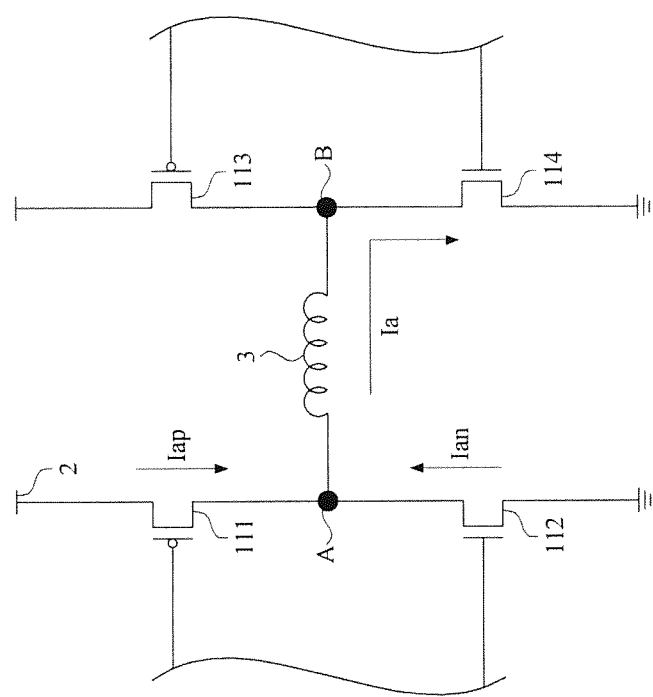
Figure 3:
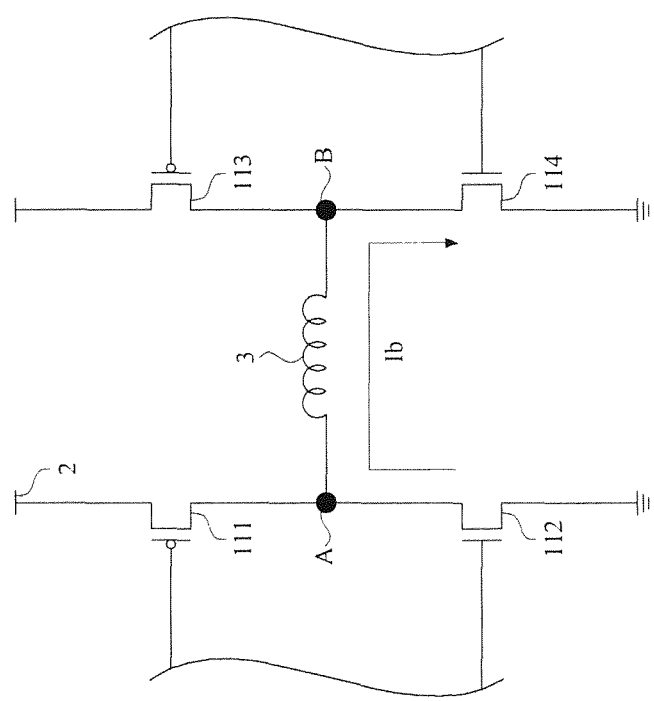
FIG. 3 through FIG. 3A illustrate schematically the switching of FIG. 1 in the second switching stage.
Figure 3A:
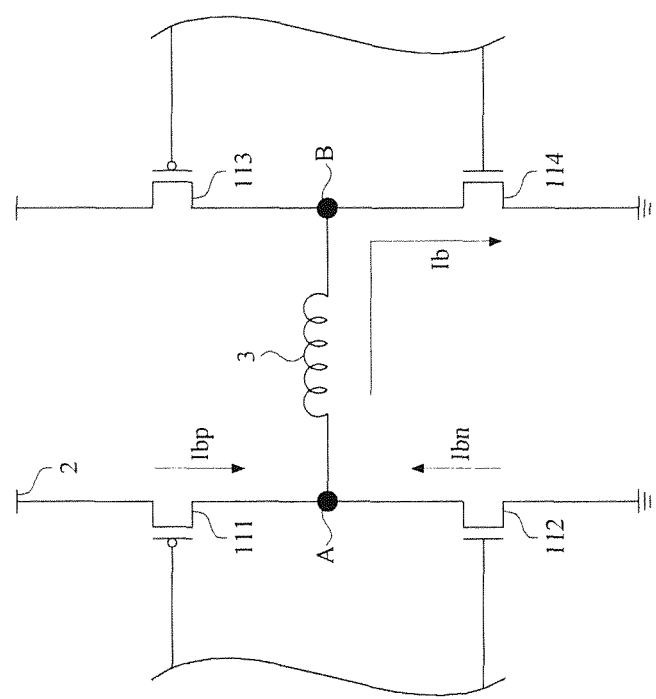

Prior to the second switch stage, the current flow is shown in either FIG. 2A or FIG. 2B. At this time, the PWM signal is applied to the second NMOSFET 114, the voltage at the first connection terminal A is VSS−ΔVa, and the voltage at the second connection terminal B is VSS+ΔVb. While in the second switch stage (the first PMOSFET is stayed off), the second driving module 15 turns on/off the second NMOSFET 114 by a second PWM signal, and thus a second duty-cycle ratio (H-duty) of the second PWM is gradually decreased. Similarly, the preferred embodiment of the present invention is not to turn off the second NMOSFET 114 directly, but to turn off the second NMOSFET 114 in a rather progressive decreasing manner. The second duty-cycle ratio (H-duty) can be decreased gradually from 100% to 0%, for example. In addition, while in the second switch stage, the second driving module 15 turns off the second PMOSFET 113 enforcedly even if the second kickback voltage is higher than the second threshold voltage, so that a second residual current Ib will flow through the first NMOSFET 112, the coil 3 and the second NMOSFET 114. At this time as shown in FIG. 3, the voltage at the first connection terminal A is VSS−ΔVa, and the voltage at the second connection terminal B is VSS+ΔVb.

Figure 4:
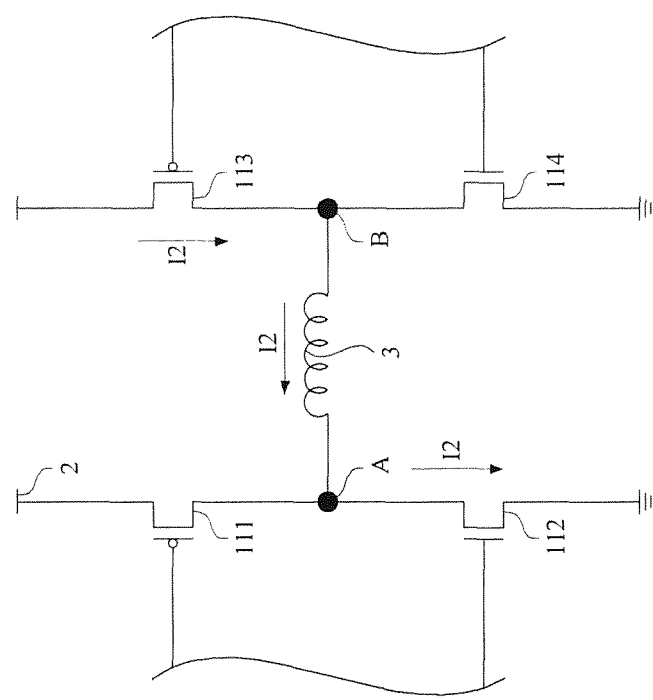
FIG. 4 through FIG. 4B illustrate schematically the switching of FIG. 1 in the third switching stage.

During the second switch stage, if the first kickback voltage gets higher than the first threshold voltage, the first driving module 14 would judge that the current of the coil 3 is zero, and thus it can be realized that the motor can be transformed from the second switch stage into the third switch stage. At this time, the first driving module 14 would turn on the first NMOSFET 112 so as to further trigger the second driving module 15 to turn on the second PMOSFET 113, such that the current I2 would flow through the second PMOSFET 113, the coil 3 and the first NMOSFET 112. As shown in FIG. 4, the voltage at the first connection terminal A now is VSS+ΔVa, and the voltage at the second connection terminal B is VSS−ΔVb. Then, the first and second driving modules 14, 15 would introduce a second current phase to drive the motor, and, after the second driving module 15 turns off the second PMOSFET 113, the operation is to enter the third switch stage.

Figure 4A:
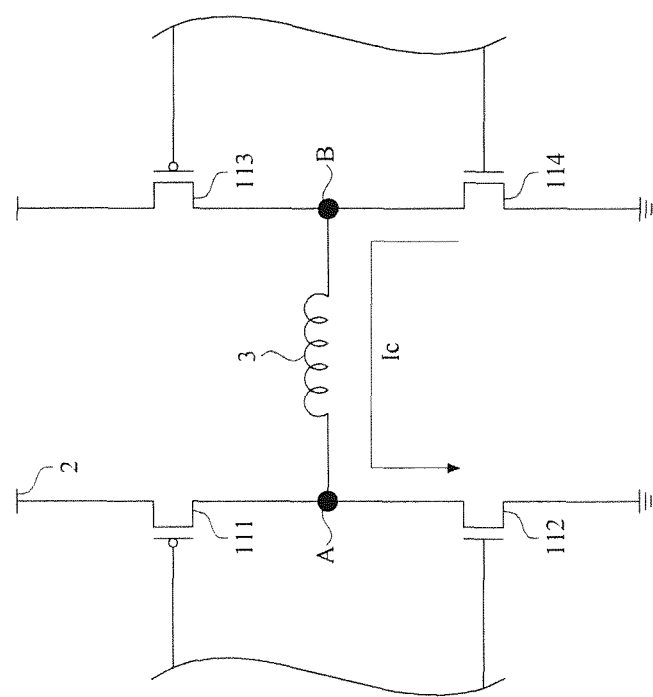
Figure 4B:
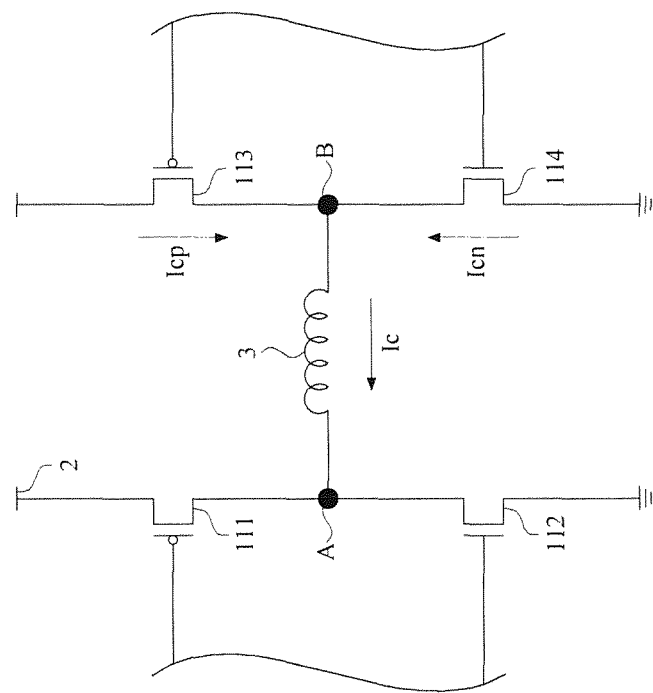

While in the third switch stage, the second driving module 15 turns on/off the second PMOSFET 113 and, as the second kickback voltage reaches the first threshold voltage, the second kickback voltage detection module 13 would issue the second detection signal S1a to have the second driving module 15 to turn on the second NMOSFET 114 so as thereby to have a third residual current Ic of the coil 3 to flow through the second NMOSFET 114, the coil 3 and the first NMOSFET 112. As shown in FIG. 4A, the voltage at the first connection terminal A is VSS+ΔVa, and the voltage at the second connection terminal B is VSS−ΔVb.

Further, while in the third switch stage and as the second kickback voltage reaches the third threshold voltage, the second kickback voltage detection module 13 would issue the second detection signal S1a to have the second driving module 15 to turn on the second PMOSFET 113 by a third PWM signal, and a third duty-cycle ratio of the third PWM signal is gradually decreased. Similarly, the turning on of the second PMOSFET 113 is neither directly nor suddenly, but the turning on thereof is actually in a rather progressive manner. Hence, the third residual current Ic may then be formed by combining the current Icp of the second PMOSFET 113 and the current Icn of the second NMOSFET 114. It shall be noted herein that the third duty-cycle ratio does follow the second duty-cycle ratio. That is to say that, as soon as the current of the coil 3 is judged to be zero, the third duty-cycle ratio would decrease gradually from the 60% if and only if that the instant second duty-cycle ratio has already reduced to the 60%. In addition, the voltage at the first connection terminal A is VSS+ΔVa, and the voltage at the second connection terminal B is VSS−ΔVb. Thereby, the motor is smoothly driven.

Figure 5:
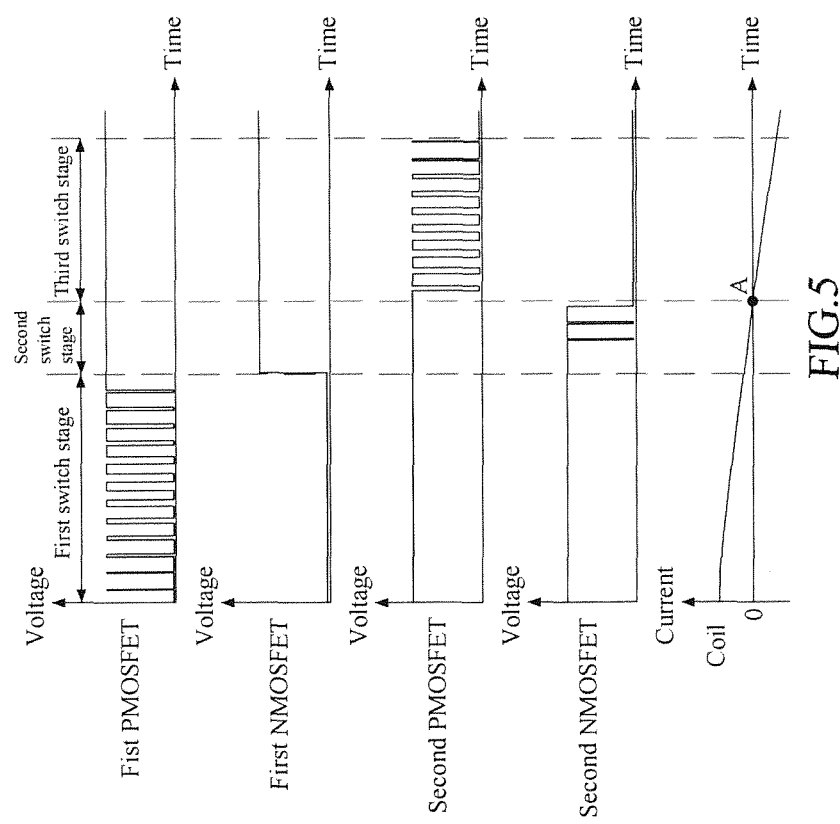
FIG. 5 shows schematically the first waveform for the preferred embodiment during the phase switching in accordance with the present invention.
Figure 6:
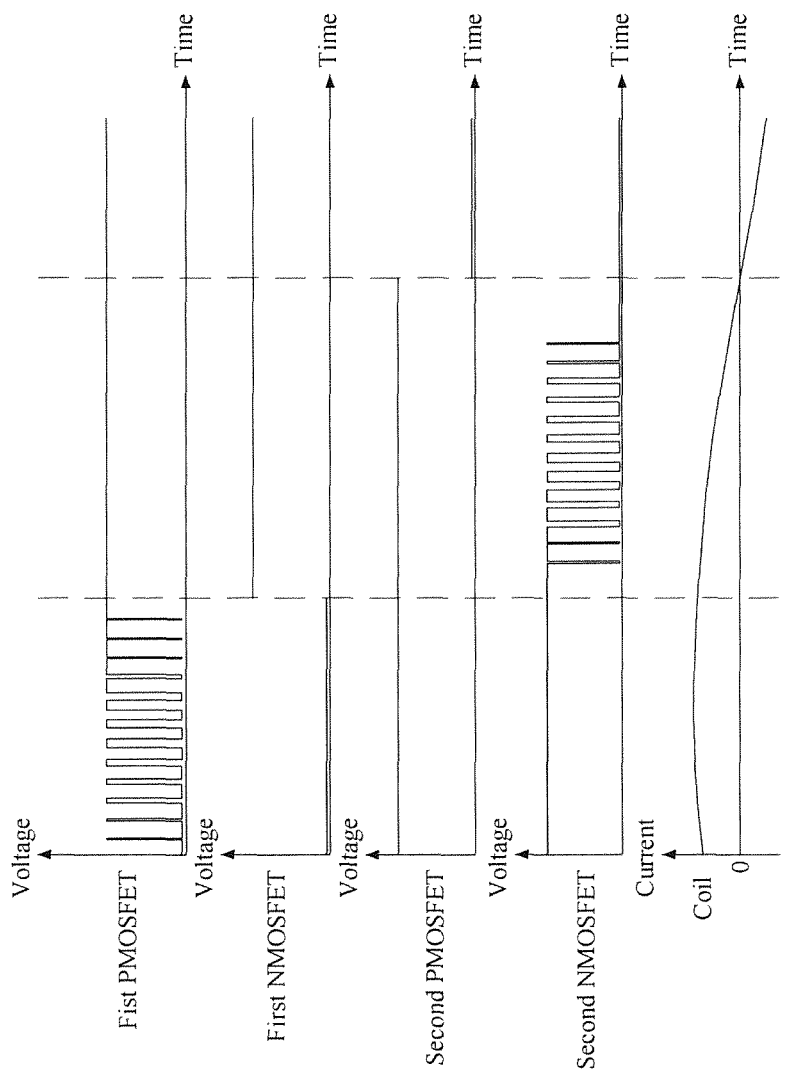
FIG. 6 shows schematically the second waveform for the preferred embodiment during the phase switching in accordance with the present invention.

Refer now to FIG. 5 and FIG. 6, in which FIG. 5 shows schematically the first waveform for the preferred embodiment during the phase switching in accordance with the present invention, and FIG. 6 shows schematically the second waveform for the preferred embodiment during the phase switching in accordance with the present invention. The major difference between FIG. 6 and FIG. 5 is to exist at the second and third switch stages. In the second switch stage, if the first kickback voltage gets higher than the first threshold voltage (at the same time, the first driving motor 14 may judge the current of the coil 3 to be zero) after the second duty-cycle ratio has already been decreased to 0%, the phase switching would directly enter the third switch stage by immediately switching to the second current phase. That is to say that the third switch stage would not perform any switching but directly switch to the second current phase.

Figure 7:
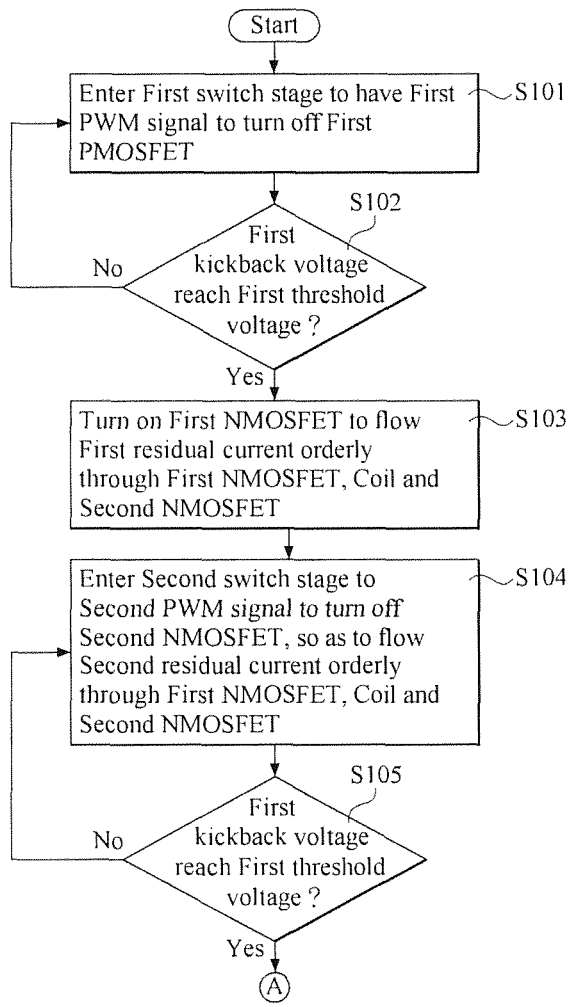
FIG. 7 and FIG. 7A show a schematic flowchart for a preferred embodiment of the method of the driving switching system applied to motors in accordance with the present invention.
Figure 7A:
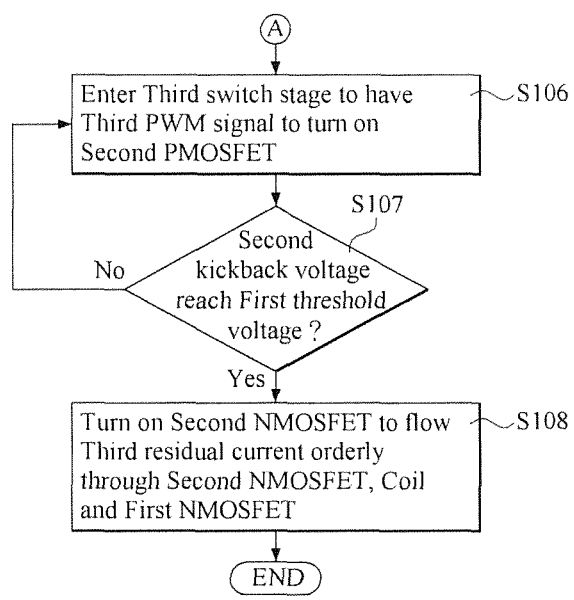

Refer now to FIG. 7 and FIG. 7A, where a schematic flowchart for a preferred embodiment of the method of the driving switching system applied to motors in accordance with the present invention is schematically shown. As illustrated, the driving switching method includes the following steps.

Step S101: Enter the first switch stage to have the first PWM signal to turn off the first PMOSFET 111.

Step S102: Determine if or not the first kickback voltage reaches the first threshold voltage?

Step S103: Turn on the first NMOSFET 112 to flow the first residual current Ia orderly through the first NMOSFET 112, the coil 3 and the second NMOSFET 114.

Step S104: Enter the second switch stage to have the second PWM signal to turn off the second NMOSFET 114, so as to flow the second residual current Ib orderly through the first NMOSFET 112, the coil 3 and the second NMOSFET 114.

Step S105: Determine if or not the first kickback voltage get higher than the first threshold voltage?

Step S106: Enter the third switch stage to have the third PWM signal to turn on the second PMOSFET 113.

Step S107: Determine if or not the second kickback voltage reaches the first threshold voltage?

Step S108: Turn on the second NMOSFET to flow the third residual current orderly through the second NMOSFET 114, the coil 3 and the first NMOSFET 112.

Practically, between Step S102 and Step S103, in order further to avoid turning-on of the parasitic diodes, the first kickback voltage is further determined whether or not it reaches the third threshold voltage. If the determination is positive, then the first PMOSFET 111 is turned on, and such an ON/OFF detection is always with the Step S102. Namely, the investigation upon whether or not the first kickback voltage reaches the third threshold voltage is kept executing in the Step S102.

In addition, after or during Step S108, the second kickback voltage is further determined whether or not it reaches the third threshold voltage. If the determination is positive, then the second PMOSFET 113 is turned on so as to effectively prevent the parasitic diodes from being turned on. All other details to execute the method are almost the same as the descriptions above about the driving switching system 1 for motors, and thus would be omitted herein.

In summary, by introducing the driving switching system applied to motors in accordance with the present invention, due to various MOSFET switching are determined by being based on if the kickback voltage reaches the first preset threshold voltage, the kickback voltage can be reduced to a degree to protect the MOSFETs and enhance the motor's driving efficiency, also all possible parasitic diodes among the MOSFETs can be prevented from being turned on, and thus damages upon the whole IC circuit can be effectively avoided. Further, in the present invention, if the third threshold voltage is reached by the kickback voltage, an additional MOSFET is chosen to flow the current so as to rapidly reduce the kickback voltage and thus to further ensure the safety of motor driving and the driving efficiency.

While the present invention has been particularly shown and described with reference to a preferred embodiment, it will be understood by those skilled in the art that various changes in form and detail may be without departing from the spirit and scope of the present invention.

What is claimed is:

1. A driving switching system for a motor, applied to drive the motor to undergo phase switching from a first current phase to a second current phase, comprising:
    an H-bridge circuit, further including:
        a first PMOSFET (P-type Metal-Oxide-Semiconductor Field-Effect Transistor);
        a first NMOSFET (N-type MOSFET), connecting electrically with the first PMOSFET so as to form a first connection terminal;
        a second PMOSFET; and
        a second NMOSFET, connecting electrically with the second PMOSFET so as to form a second connection terminal, the first connection terminal and the second connection terminal being both connected with at least one coil;
    a first kickback voltage detection module, preset with a first threshold voltage, connected electrically with the first connection terminal for detecting a first kickback voltage at the first connection terminal, generating a first detection signal according to the first kickback voltage;
    a second kickback voltage detection module, preset with a second threshold voltage, connected electrically with the second connection terminal for detecting a second kickback voltage at the second connection terminal, generating a second detection signal according to the second kickback voltage;
    a first driving module, connected electrically with the first kickback voltage detection module so as therefrom to receive the first detection signal and to selectively turn on and off the first PMOSFET and the first NMOSFET in a first switch stage, a second switch stage and a third switch stage of the phase switching; and
    a second driving module, connected electrically with the second kickback voltage detection module and the first driving module so as therefrom to receive the second detection signal and to selectively turn on and off the second PMOSFET and the second NMOSFET in the first switch stage, the second switch stage and the third switch stage of the phase switching;
    wherein, while in the first switch stage, the first driving module turns off the first PMOSFET via a first PWM (Pulse Width Modulation) signal, and a first duty-cycle ratio of the first PWM signal is gradually increased;
    wherein, as the first kickback voltage reaches the first threshold voltage, the first kickback voltage detection module issues the first detection signal to the first driving module to turn on the first NMOSFET so as to have a first residual current to flow through the first NMOSFET, the at least one coil and the second NMOSFET;
    wherein, while in the second switch stage, the second driving module turns off the second NMOSFET via a second PWM signal, and a second duty-cycle ratio of the second PWM signal is gradually decreased so as to have a second residual current to flow orderly through the first NMOSFET, the at least one coil and the second NMOSFET;
    wherein, while the first kickback voltage gets higher than the first threshold voltage so as to have the first driving module to determine and confirm that the second switch stage has been switched to the third switch stage, the second driving module is triggered to turn on the second PMOSFET via a third PWM signal, and a third duty-cycle ratio of the third PWM signal is gradually decreased;
    wherein, as the second kickback voltage reaches the first threshold voltage, the second kickback voltage detection module issues the second detection signal to have the second driving module to turn on the second NMOSFET so as to have a third residual current to flow orderly through the second NMOSFET, the at least one coil and the first NMOSFET.

2. The driving switching system for a motor according to claim 1, wherein the first kickback voltage detection module further includes a third threshold voltage; wherein, while in the first switch stage and as the first kickback voltage reaches the third threshold voltage, the first kickback voltage detection module further has the first driving module to turn on the first PMOSFET.

3. The driving switching system for a motor according to claim 2, wherein the first threshold voltage is less than 0, and the third threshold voltage is lower than the first threshold voltage.

4. The driving switching system for a motor according to claim 2, wherein, while in the third switch stage and as the second kickback voltage reaches the third threshold voltage, the second kickback voltage detection module has the second driving module to turn on the second PMOSFET.

5. The driving switching system for a motor according to claim 4, wherein the first PMOSFET and the second PMOSFET are electrically connected with a power source, the second threshold voltage is larger than the voltage provided by the power source.

6. A driving switching method, applied to the driving switching system of claim 1, comprising the steps of:
    (a) entering the first switch stage to have the first PWM signal to turn off the first PMOSFET, wherein the first duty-cycle ratio of the first PWM signal is gradually increased;
    (b) determining if or not the first kickback voltage reaches the first threshold voltage;
    (c) while a result of the step (b) is positive, turning on the first NMOSFET to flow the first residual current orderly through the first NMOSFET, the at least one coil and the second NMOSFET;
    (d) entering the second switch stage to have the second PWM signal to turn off the second NMOSFET so as to flow the second residual current orderly through the first NMOSFET, the at least one coil and the second NMOSFET, wherein the second duty-cycle ratio of the second PWM signal is gradually decreased;
    (e) determining if or not the first kickback voltage gets higher than the first threshold voltage;
    (f) while a result of the step (e) is positive, entering the third switch stage to have the third PWM signal to turn on the second PMOSFET, wherein the third duty-cycle ratio of the third PWM signal is gradually decreased;

(g) determining if or not the second kickback voltage reaches the first threshold voltage; and (h) turning on the second NMOSFET to flow the third residual current orderly through the second NMOSFET, the at least one coil and the first NMOSFET.

7. The driving switching method of claim 6, wherein the first kickback voltage detection module further includes a third threshold voltage, and, between the step (c) and the step (d), the driving switching method further included the steps of:

(c0) determining if or not the first kickback voltage reaches the third threshold voltage; and (c1) while a result of the step (c0) is positive, turning on the first PMOSFET.

8. The driving switching method of claim 6, posterior to the step (h), further including the steps of:

(h0) determining if or not the second kickback voltage reaches the third threshold voltage; and (h1) while a result of the step (h0) is positive, turning on the second PMOSFET.

9. The driving switching method of claim 6, wherein the first threshold voltage is smaller than a zero, and the third threshold voltage is lower than the first threshold voltage.

10. The driving switching method of claim 6, wherein the first PMOSFET and the second PMOSFET are both electrically connected with a power source, the second threshold voltage is higher than a voltage provided by the power source.

* * * * *